(12) United States Patent
Arizono

(10) Patent No.: US 11,658,503 B2
(45) Date of Patent: May 23, 2023

(54) CHARGING TIME COMPUTATION METHOD AND CHARGE CONTROL DEVICE

(71) Applicant: Nissan Motor Co., Ltd., Yokohama (JP)

(72) Inventor: Hidetoshi Arizono, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 294 days.

(21) Appl. No.: 16/635,207

(22) PCT Filed: Jul. 31, 2017

(86) PCT No.: PCT/JP2017/027750
§ 371 (c)(1),
(2) Date: Jan. 30, 2020

(87) PCT Pub. No.: WO2019/026143
PCT Pub. Date: Feb. 7, 2019

(65) Prior Publication Data
US 2020/0373779 A1     Nov. 26, 2020

(51) Int. Cl.
*H02J 7/00* (2006.01)
*H01M 10/48* (2006.01)
*H01M 10/44* (2006.01)

(52) U.S. Cl.
CPC ....... *H02J 7/007194* (2020.01); *H01M 10/48* (2013.01); *H02J 7/0048* (2020.01);
(Continued)

(58) Field of Classification Search
CPC .............................. H02J 7/007194
See application file for complete search history.

(56) References Cited

U.S. PATENT DOCUMENTS

2008/0197813 A1* 8/2008 Asakura ............ H02J 7/007194
320/150
2012/0326655 A1* 12/2012 Nomura .................. B60L 53/14
320/107

(Continued)

FOREIGN PATENT DOCUMENTS

JP  2011-091879 A  5/2011
JP  2013-005679 A  1/2013
JP  2015-171208 A  9/2015

*Primary Examiner* — Drew A Dunn
*Assistant Examiner* — Pamela J Jeppson
(74) *Attorney, Agent, or Firm* — Young Basile Hanlon & MacFarlane, P.C.

(57) ABSTRACT

A chargeable power of the battery is calculated based on a voltage and charge upper-limit voltage of a battery; the chargeable power and outputtable power of the charger are compared and a lower power is calculated as a first charge power; a timing that the battery temperature reaches a predetermined limit is calculated as a first timing; based on the temperature, surrounding temperature, and charge current when charging with the first charge power, a second charge power limited according to the battery temperature is calculated; by referencing a map, a charge time that comes after the first timing is calculated as a second charge time based on the state of the battery when the first timing is reached and the second charge power; and time obtained by adding the second charge time to the first charge time until the first timing is reached is calculated as the total charge time.

4 Claims, 4 Drawing Sheets

(52) U.S. Cl.
CPC .. *H02J 7/007182* (2020.01); *H02J 7/007192* (2020.01); *H01M 10/443* (2013.01); *H01M 10/488* (2013.01)

(56) References Cited

U.S. PATENT DOCUMENTS

| | | | |
|---|---|---|---|
| 2014/0015495 A1* | 1/2014 | Woo | H02J 7/0029 320/160 |
| 2015/0236524 A1* | 8/2015 | Takano | H01M 10/443 320/107 |
| 2017/0267107 A1* | 9/2017 | Miyashita | H01M 10/443 |
| 2018/0194592 A1* | 7/2018 | Darling | H02J 7/0047 |

* cited by examiner

CHARGING TIME COMPUTATION METHOD AND CHARGE CONTROL DEVICE

TECHNICAL FIELD

The present invention relates to a charge-time calculation method and charge controller.

BACKGROUND

As a method for calculating a remaining charge time, a method is known comprising: determining an SOC from terminal voltage and temperature of a battery by referencing voltage-battery capacity relationship information showing a relationship between battery capacity and terminal voltage until the battery capacity reaches maximum and the voltage is fully charged; and determining a remaining charge time using a map showing a relationship between the SOC and time required for full charge from the present time (JP 2011-91879 A).

SUMMARY

However, there is a problem that accuracy of charge-time calculation is low.

A problem to be solved by the present invention is to provide a charge-time calculation method and a charge controller with higher accuracy of charge-time calculation.

In the present invention, the above problem is solved by calculating a timing when the battery temperature reaches a predetermined limit temperature as a first timing based on battery temperature, battery surrounding temperature, and charge current when charging by a first charge power; by referencing the map, calculating charge time that comes after the first timing as a second charge time based on a state of the battery when the first timing is reached and the second charge power; and calculating the time obtained by adding the second charge time to the first charge time until the first timing is reached as a total charge time of the battery.

According to the present invention, calculation accuracy of the charge time is raised.

DETAILED DESCRIPTION

Figure 1:
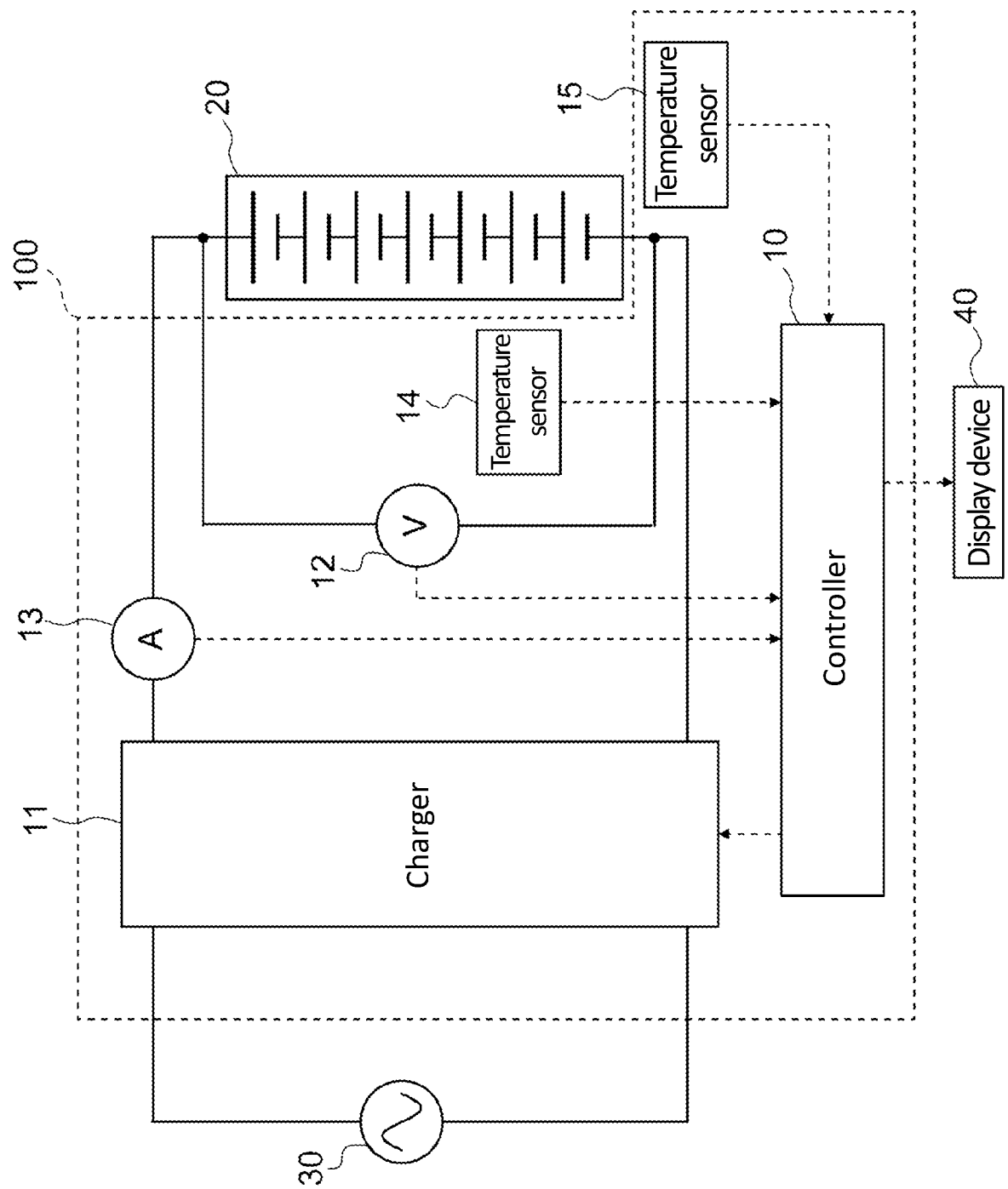
FIG. 1 is a block diagram of a charge system according to the present embodiment.

In the following, embodiments of the present invention will be explained based on the drawings. FIG. 1 is a block diagram of a charge system according to the present embodiment. The charge system according to the present embodiment is a system for charging a battery installed on a vehicle, such as an electric vehicle, and a plug-in hybrid vehicle, etc. The charge system may be installed on another device with a battery instead of a vehicle.

The charge system according to the present embodiment includes a battery 20, a power supply 30, and a charge controller 100. The charge controller 100 controls charge of the battery 20 by managing a state of the battery 20, controlling the power input from the power supply 30, and controlling the charge power to the battery 20. Also, the charge controller 100 calculates a charge time of the battery 20. The charge controller 100 includes a controller 10, a charger 11, a voltage sensor 12, a current sensor 13, and temperature sensors 14 and 15.

[The controller 10 controls charge power to the battery 20 output from the charger 11 by obtaining detected values of the voltage sensor 12, the current sensor 13, and the temperature sensors 14 and 15. In the following descriptions, the charge control of the charge power from the charger 11 to the battery 20 by the controller 10 may also be simply called as a charge control by the controller 10. The controller 10 includes a charge control function for controlling the charge power to the battery 20, and a charge-time calculation function for calculating the charge time of the battery 20 (that is, the charge time from the start to end of charging and may also be called as a total charge time). The controller 10 includes a processor (CPU) and a memory, etc. To the memory, programs for performing various functions, such as the charge control function and charge-time calculation function included to the battery 20 are stored. Also, a CPU is hardware for executing various programs stored in the memory. The CPU performs various functions by executing the programs. The controller 10 manages a state of the battery 20 by calculating a state of charge (State of Charge: SOC) of the battery 20. The controller 10, according to the charge mode of the battery 20, calculates the charge time of the battery 20. The charge time calculated by the controller 10 is displayed, for example, in case of a vehicle such as an electric vehicle, a plug-in hybrid vehicle, etc., to a display device 40 arranged to a position visible from a user of the vehicle such as an instrument panel, or the like. The time obtained by subtracting an elapsed time from the start of charging from the calculated charge time (the time from the start of charge to the end of charge) may be displayed to a display device 40 as the time from the present to the end of charge (remaining charge time).

The charger 11 is connected between the battery 20 and power supply 30. The charger 11 is connected to the power supply 30. The charger 11 converts voltage input from the power supply 30 to voltage that is suitable for charging the battery 20, and outputs the converted voltage as the charge voltage of the battery 20 to the battery 20. The charger 11 includes a voltage conversion circuit, and a switch, etc.

The voltage sensor 12 is a sensor for detecting the voltage between terminals of the battery 20. When the battery 20 is formed by a plurality of batteries, the voltage sensor 12 detects voltage between each terminal of the batteries. The voltage sensor 12 is connected between terminals of each battery included to the battery 20. The current sensor 13 is a sensor for detecting charge current of the battery 20. The current sensor 13 is connected between an output of the charger 11 and the battery 20.

The temperature sensor 14 is a sensor for detecting temperature of the battery 20 itself. The temperature sensor 14 is disposed to the battery 20 in a way directly attached to the battery 20. However, the temperature sensor 14 may be disposed to a position where the battery 20 can be indirectly detected. The temperature sensor 15 is a sensor for detecting surrounding temperature (environmental temperature) of the battery 20. The temperature sensor 15 is arranged outside the battery 20.

The battery 20 includes a secondary battery (cell) such as a lithium-ion battery, etc. The secondary battery is connected in parallel or in series. The power supply 30 is an AC power supply for home use, or the like.

In the present embodiment, when charging the battery 20 using an AC power supply provided at general home (for example, a case of normal charge), by electrically connecting an outlet included to the power supply 30 and the charger 11 arranged to the vehicle with a charging cable, the charger 11, battery 20, and power supply 30 are electrically connected. When charging the battery 20 using a charging device disposed outdoor (for example, a case of quick charge), the charger 11 and power supply 30 will be included to the outdoor charging device, and by electrically connecting a charging cable connected to the output of the charger 11 to the battery 20, the charger 11, battery 20, and power supply 30 are electrically connected.

Next, the charge control function of the controller 10 will be explained. The controller 10 controls charge power for charging the battery 20 by controlling the charger 11 according to the state of the battery and the upper-limit voltage of the battery 20.

The controller 10 calculates chargeable power based on a difference between the voltage of the battery 20 and predetermined upper-limit voltage (for example, the voltage when the battery 20 became a full charge), and based on the chargeable power, the charge power supplied from the charger 11 to the battery 20 is controlled. Specifically, the charger 11 is controlled in a way that when an outputtable power of the charger 11, that is the maximum value of the outputtable power, is smaller than the chargeable power, constant-power charge is performed with the outputtable power of the charger 11, and when the outputtable power of the charger 11 is the chargeable power of the battery 20 or greater, charge is performed with the chargeable power. Also, when the temperature of the battery 20 becomes a predetermined temperature specified in advance or higher, the controller 10 controls the charge current supplied to the battery 20 from the charger 11 to the limit charge current, that is a current value that can suppress temperature rise of the battery 20 corresponding to the temperature of the battery 20.

Now, in general, since a voltage change (for example, 20V) of the battery 20 during charge is sufficiently small against the outputtable power of the charger 11 (for example, 50 kW), a current change when performing constant-power charge with the outputtable power of the charger 11 is small. Accordingly, the constant-power charge of the charger 11 with the outputtable power can be said as almost CC charge (constant-current charge). Also, the voltage of the battery 20 when charge with the chargeable power is started is already in a state close to the upper-limit voltage since the outputtable power of the charger 11 is the chargeable power of the battery 20 or greater, the voltage change of the battery 20 from the point is extremely small. Accordingly, charging with the chargeable power after the outputtable power of the charger 11 became the chargeable power or greater of the battery 20 can be said as CV charge (constant-voltage charge).

As mentioned above, the charge control performed by the controller 10 based on the chargeable power can be said as the CC-CV charge. Accordingly, the controller 10 may perform charging while switching between a plurality of charge modes including the CC charge mode, CC-CV charge mode, and temperature-switch charge mode accordingly. In the CC charge mode, the battery 20 is charged in a CC (constant-current) method (a constant-current method). The CC (constant current) method is a method where the battery 20 is charged with constant charge current. In the CC-CV charge mode, the battery 20 is charged while switching from the CC method to the CV (constant-voltage) method (constant-voltage method), based on the chargeable power of the battery 20, during the charge based on the chargeable power of the battery 20. The CV method is a method of charging the battery 20 with constant charge voltage. When switching to the CV method after the charge in the CC method, the battery 20 is charged up to the target SOC while making the charge current gradually small while keeping the charge voltage to a constant level. In the temperature-switch charge mode, after the temperature of the battery 20 reaches the limit temperature, the battery 20 is charged with the limited charge current by limiting the charge current to the limited charge current that is a current value capable of suppressing temperature rise in the battery 20 according to the battery temperature.

The controller 10 calculates a present SOC (hereafter, also called as SOC) of the battery 20 and chargeable power of the battery 20 as the initial state of the battery 20. To the memory of the controller 10, a map (a voltage-SOC map) showing correspondence between the open-circuit voltage (OCV) and SOC of the battery 20 is stored. The controller 10 calculates an SOC that corresponds to the detected voltage (corresponds to open-circuit voltage) of the voltage sensor 12 by referencing the voltage-SOC map as the present SOC of the battery 20. More, the relationship shown with the voltage-SOC map changes depending on a deterioration level of the battery 20, and thus the controller 10 may calculate the present SOC after correcting the correspondence of the voltage and SOC according to the deterioration level while calculating a deterioration level of the battery 20. The controller 10 can calculate the deterioration level based on a comparison between the open-circuit voltage of the battery at the time of shipment and the present open-circuit voltage, or magnitude of the internal resistance.

The chargeable power is the maximum power that can be charged while suppressing acceleration of deterioration of the battery 20 when charging the battery 20, and is the maximum input power that can be input to the battery 20 from the charger 11. The power that can be input to the battery 20 changes according to a difference between the present voltage of the battery 20 and the upper-limit voltage of the battery, and thus the chargeable power may be calculated from a difference between the present voltage of the battery 20 and the upper-limit voltage (charge upper-limit voltage) of the battery. More, the chargeable power is also called as inputtable power or maximum chargeable power, or maximum inputtable power in general, however, the term chargeable power is used in the present embodiment. The controller 10 calculates the chargeable power int the following manner.

To the battery 20, according to the performance of the battery 20, the charge upper-limit voltage is set for each cell. The charge upper-limit voltage is the upper-limit voltage when charging the battery 20 to prevent deterioration of the battery 20. To the charge upper-limit voltage, the voltage when lithium deposition starts inside the battery (cell) forming the battery 20 or the voltage lower than the voltage when the lithium deposition starts, is set.

The charge upper-limit voltage is calculated according to the charge current input to the battery 20, battery temperature, and internal resistance of the battery 20. For example, the charge upper-limit voltage is calculated low as the charge current of the battery 20 becomes greater and calculated high as the charge current of the battery 20 becomes small.

When the battery is formed by a plurality of batteries, the voltage of a battery with the highest voltage among the batteries should be used for the charge upper-limit voltage. The controller 10 specifies the cell with the highest voltage among the voltage of each cell. The chargeable power calculation part 55 calculates inputtable current that can be input to the battery based on the voltage of the specified cell, internal resistance of the cell, charge current, and charge upper-limit voltage of the cell.

The inputtable current is calculated from internal resistance of a cell having the highest terminal voltage and the charge upper-limit voltage of the cell. The internal resistance is calculated from the terminal voltage of the cell and charge current of the cell.

Figure 2:
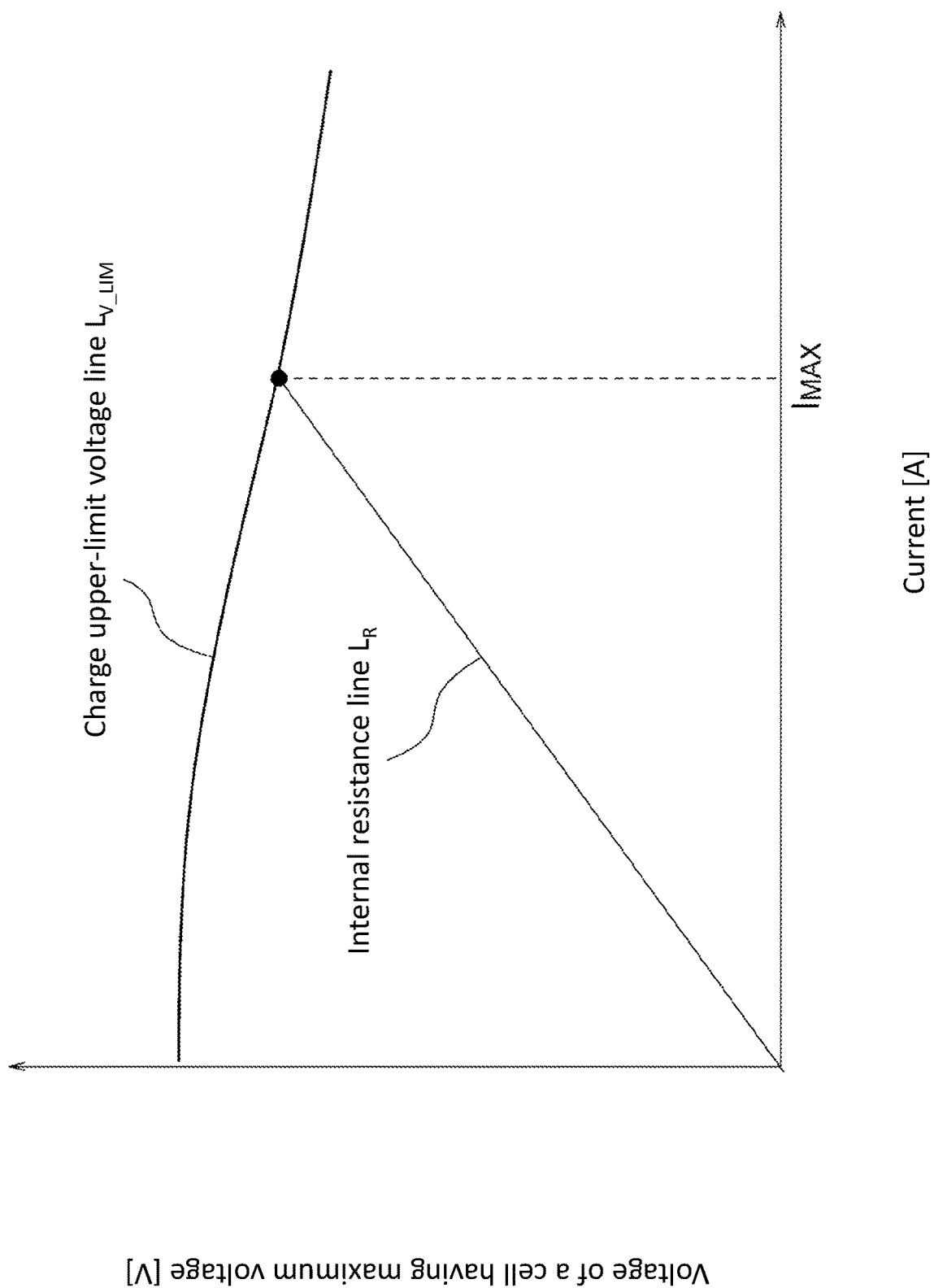
FIG. 2 is a graph for explaining correspondence between maximum voltage of a cell included to a battery and input-table power.

FIG. 2 is a figure for explaining calculation method of the inputtable current (IMAX). The controller 10 calculates an internal resistance line LR of the cell from the internal resistance of the cell with the highest terminal voltage, as shown in FIG. 2.

The internal resistance line LR is a straight line showing a relationship between the charge current of the cell and voltage of the cell for the cell with the highest terminal voltage. More, the internal resistance line LR can be calculated, for example, from the total internal resistance of the battery 20 and open-circuit voltage of the battery 20. The total internal resistance of the battery 20 is the resistance value of all of the plurality of cells included to the battery 20.

The charge upper-limit voltage line LV_LIM has correlation with the charge current of the battery 20. For this reason, a map having correlation between the charge upper-limit voltage (corresponds to charge upper-limit voltage line LV_LIM) and charge current of the battery 20 is stored to the memory in advance.

As to the characteristics shown in FIG. 2, the current at the intersection point of the charge upper-limit voltage line LV_LIM and internal resistance line LR is the inputtable current to the cell having the highest terminal voltage. In this way, the inputtable current is calculated. As described above, the internal resistance can be calculated from the open-circuit voltage of the battery 20 and the internal resistance becomes small as the open-circuit voltage becomes low. Then, from the characteristic shown in FIG. 2, the inputtable current becomes high as the internal resistance becomes low.

Then, the chargeable power calculation part 55 can calculate the chargeable power by multiplying the inputtable current (IMAX) to the charge upper-limit voltage of the battery 20. In this way, the controller 10 calculates chargeable power of the battery 20 based on the voltage of the battery 20 and charge upper-limit voltage of the battery 20. The controller 10 calculates the chargeable power also during charge of the battery 20. More, the calculation method of the chargeable power can be a method other than the one mentioned above.

The controller 10 switches a charge mode according to the chargeable power of the battery 20 and outputtable power of the charger 11. The outputtable power of the charger 11 represents the maximum output power outputtable from the charger 11, and corresponds to rated power of the charger 11. In other words, the outputtable power is a value set in advance according to the performance of the charger 11, and the output power of the charger 11 is limited to this outputtable power or lower. To the charger 11, there are quick charger with high outputtable power and normal charger with low outputtable power than the quick charger. The controller 50 receives a signal sent from the charger 11 when a connection between the charger 11 and battery 20, such as by a cable, is confirmed and obtains outputtable power of the charger 11.

The controller 10 compares the chargeable power of the battery 20 and outputtable power of the charger 11 and when the chargeable power of the battery 20 is higher than the outputtable power of the charger 11, the outputtable power of the charger 11 is set to the charge power of the battery 20. Then, the controller 10 charges the battery 20 in a way the charge power to the battery 20 is maintained constant at the calculated charge power. More, since charge of the battery 20 with the outputtable power of the charger 11 can be said as the charge in the almost CC method, in the following the term CC method is used for convenience.

When a state where the chargeable power of the battery becomes higher than the outputtable power of the charger 11 is maintained from the start of charging to the end of charging, the controller 10 charges the battery 20 only in the CC method. For example, when a user sets an SOC lower than a full charge to a target value and charge the battery 20 with the normal charger, even when the battery 20 is charged to the target SOC, the chargeable power of the battery is still higher than the outputtable power of the charger 11. In such charging, the controller 10 charges the battery 20 only in the CC method.

When the chargeable power of the battery 20 is lower than the outputtable power of the charger, the controller 10 sets the chargeable power of the battery 20 to the charge power of the battery 20. Here, the case in which the chargeable power of the battery 20 is lower than the outputtable power of the charger, means a state where the voltage of the battery is close to the almost upper-limit voltage, and thus the charge where the charge current of the battery 20 is decreased along with elapse of time is performed while maintaining the voltage of the battery 20 to almost constant. In other words, the controller 10, while maintaining the voltage of the battery 20 to almost constant, performs the charge where the charge current of the battery 20 lowers along with elapse of time. Accordingly, charge of the battery 20 with the chargeable power is called as a CV method in the following, for convenience.

For example, when the user sets an SOC close to the full charge to the target SOC, and the battery 20 is charged with a charger, the chargeable power of the battery 20 is higher than the outputtable power of the charger at the time charge of the battery 20 is started. First, the controller 10 charges the battery 20 in the CC method. The voltage of the battery 20 gradually becomes high, and the chargeable power of the battery 20 becomes low. Then, when the chargeable power of the battery 20 becomes lower than the outputtable power of the charger, the controller 10 switches the charge mode of the battery 20 to the CV method from the CC method. The controller 10 charges the battery 20 in the CV method until the SOC of the battery 20 reaches the target SOC.

During the charge, in order to prevent battery 20 from becoming a high-temperature state, limit temperature is set. The limit temperature is a temperature threshold value set in advance. The controller 10 manages the temperature of the battery 20 using the temperature sensor 14 while charging. The controller 10 compares the temperature detected by the temperature sensor 14 and limit temperature. When the detected temperature of the temperature sensor 14 is lower than the limit temperature, the controller 10 charges the battery 20 in the CC method. Whereas, when the detected temperature of the temperature sensor 14 is the limit temperature or higher, the controller 10 charges the battery 20 with the limit charge current that is a current value that can suppress temperature rise of the battery 20. For example, when charging the battery 20 under an environment where the surrounding temperature of the battery 20 is high, temperature of the battery 20 also becomes high during the charge, and thus is in a state the temperature of the battery 20 easily reaches the limit temperature. Under such environment, to charge the battery 20, the controller 10 starts charge of the battery 20 in the CC method, and at the point the temperature of the battery 20 reaches the limit temperature, starts limitation of the charge current by limiting the charge power. Then, the controller 10 charges with the limited charge power until the SOC of the battery 20 reaches the target SOC. More, such charge current limitation can be performed, for example, by limiting the charge power to the power obtained by multiplying a coefficient of 1 or smaller, which reduces the charge power as the temperature of the battery 20 becomes high to the charge power at the point the temperature of the battery 20 reaches the limit temperature. In such case, as the temperature of the battery 20 becomes high, charge current (limit charge current) is limited to a small value as the temperature of the battery 20 becomes high, the charge current becomes a current value that does not raise temperature of the battery 20. The limitation method of the charge current is not limited to the above and the charge current may be limited to a current value set in advance that is small enough to prevent temperature rise of the battery 20.

As above, the controller 10 controls the charge power of the battery 20 while managing both the chargeable power of the battery 20 and temperature of the battery 20. In other words, when the temperature of the battery 20 reaches the limit temperature before the chargeable power of the battery 20 becomes lower than the outputtable power of the charger 11, the controller 10 charges the battery 20 with the limited charge current for suppressing rise of temperature in the battery 20 instead of the CC method by a temperature-switch charge mode. Whereas, when the chargeable power of the battery 20 becomes lower than the outputtable power of the charger 11 before the temperature of the battery 20 becomes higher than the limit temperature, the controller 10 switches from the CC method to the CV method by the CC-CV charge mode and charges the battery 20. When charging in the CV method, the charge power (charge current) decreases along with SOC increase, and thus temperature rise of the battery 20 is suppressed. Accordingly, when the charging method is switched to the CV method from the CC method before the temperature of the battery 20 reaches the limit temperature, the temperature of the battery 20 does not reach the limit temperature. In this way, in the charge system according to the present embodiment, the battery 20 is charged while avoiding the battery 20 from becoming a high-temperature state.

During the charge, the controller 10 detects charge current of the battery 20 using the current sensor 13. The controller 10 calculates an SOC during charge by integrating the detected charge current. Then, when the present SOC of the battery 20 reaches the target SOC, the controller 10 stops output to the battery 20 from the charger 11 and ends charge of the battery 20.

Figure 3:
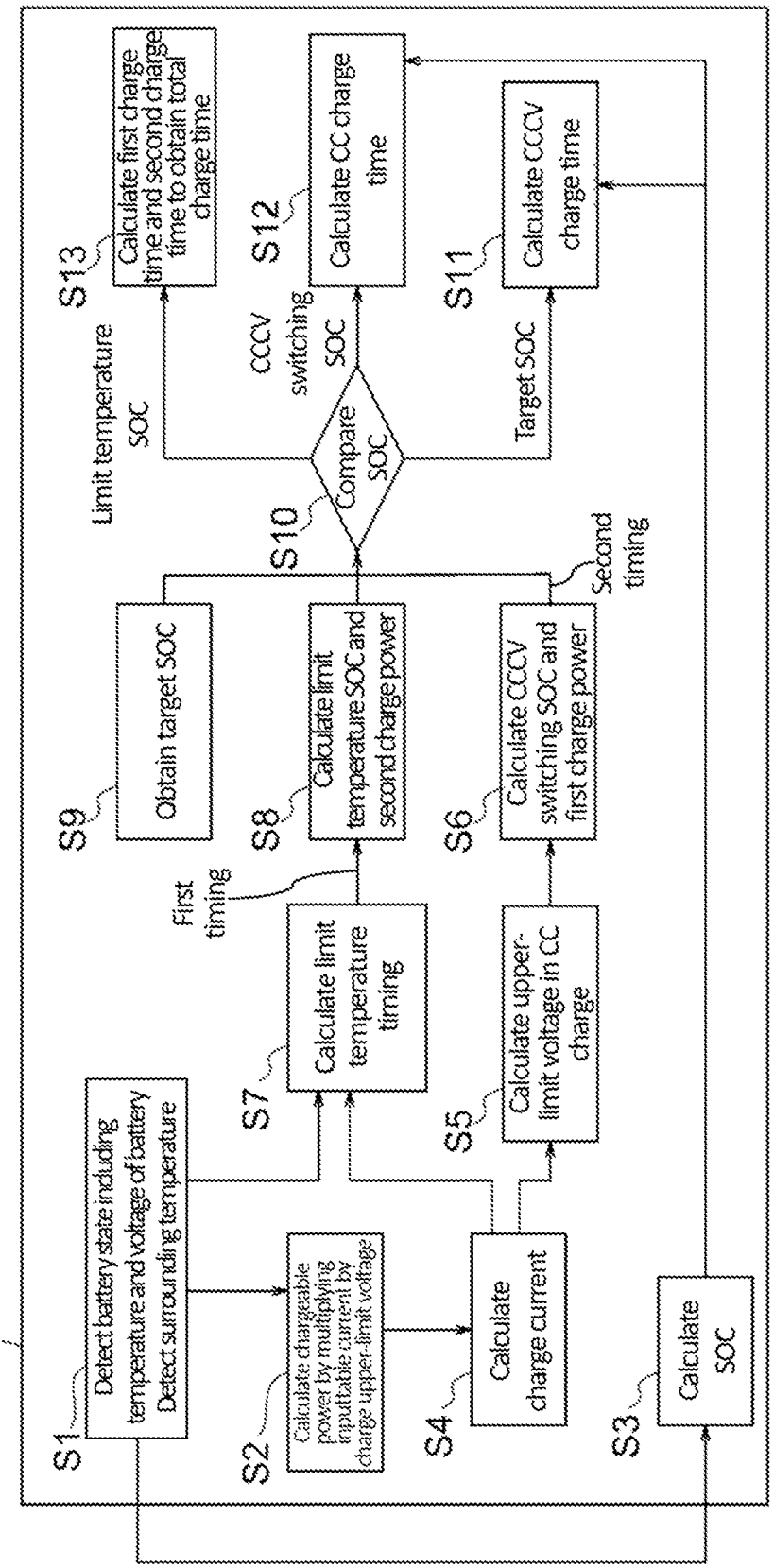
FIG. 3 is a block diagram of a controller of FIG. 1.

Next, the charge-time calculation function of the controller 10 will be explained using FIG. 3. FIG. 3 is a block diagram for explaining the charge-time calculation function of the controller 10. Arrows in FIG. 3 show an order of the main control flow, however, the controller 10 may not necessarily execute the control flow in the order shown with the arrows.

The controller 10 calculates the charge time for each of a plurality of target SOCs set in advance. The target SOCs are, for example, 25%, 50%, 75%, and 100%. The controller 10 switches the charge control mode depending on the target SOC. The calculation method for the charge time varies depending on the charge control mode. For this reason, the controller 10 decides the charge control mode used when charging up to the target SOC for each of the plurality of target SOCs, and calculates charge time when charged with the decided charge control mode for each of the target SOCs. The controller 10 calculates the charge time between the present SOC and target SOC of the battery 20 in the method described below before charging of the battery actually starts.

In step S1, in order to confirm the state at the start of charging of the battery 20, the controller 10 detects voltage of the battery 20 using the voltage sensor 12, and detects (detection of the battery state) the present temperature of the battery 20 using the temperature sensor 14. Also, the controller 10 detects (detection of the battery surrounding temperature) the surrounding temperature of the battery 20 using the temperature sensor 14. In step S2, by the method similar to the charge control function, the present chargeable power of the battery 20 is calculated. In step S3, the controller 10 calculates a present SOC based on the present open-circuit voltage of the battery 20 in a method similar to the charge control function. In step S4, the controller 10 calculates charge current of the battery based on the present chargeable power of the battery 20 and outputtable power of the charger 11.

In step S5, the controller 10 calculates the charge upper-limit voltage (the upper-limit voltage in the CC charge) of the battery 20. As shown in FIG. 2, the charge upper-limit voltage changes by the charge current. Since the map shown in FIG. 2 is stored to the controller 10, the controller 10 calculates the charge upper-limit voltage while referencing the map based on the charge current calculated in step S4.

In step S6, the controller 10 calculates an SOC (hereafter also called as CCCV switching SOC) at CCCV (constant-current constant-voltage) switching timing (hereafter also called as a second timing) while calculating a timing (hereafter also called as a CCCV switching timing) where the chargeable power of the battery 20 becomes below the outputtable power of the charger. The state change (state transition) of the battery during the charge can be obtained from the characteristics of the battery 20 and output characteristics of the charger 11 before the charge starts. For this reason, when charging in the CC method is to be performed, the controller 10 calculates upward transition of the battery voltage from the start of charging of the battery 20, and from the calculated battery voltage and upper voltage, calculates a timing where the chargeable power becomes below the outputtable power of the charger as a CCCV switching timing.

The controller 10 determines an integrated value of the charge current from the start of charge to CCCV switching timing, and by adding the integrated value to the present charge capacity of the battery 20, calculates a charge capacity at the CCCV switching timing. The present charge capacity is calculated from the present SOC of the battery 20. Then, the controller 10 calculates the CCCV switching SOC by dividing the charge capacity at the CCCV switching timing by the full-charge capacity of the battery 20.

In step S7, based on the temperature of the battery 20, surrounding temperature of the battery 20, and charge current during charge by the CC method, the controller 10 calculates a timing of limit temperature arrival (hereafter, also called as limit-temperature timing or a first timing). The limit-temperature timing is a timing that the battery temperature that rises by charging reaches the limit temperature. The limit temperature is set in advance according to the performance of the battery 20, and may be set to 50° C., for example.

Specifically, the controller 10 calculates the limit-temperature timing with the following formula (1).

[Formula 1]

$$\Delta t = (TLIM - Tb)/[\{I2 \times R - K \times (Ta - Tb)\}/Qc] \quad (1)$$

In the above, t represents the time from the start of charging to the limit-temperature timing, TLIM represents the limit temperature, Ta represents surrounding temperature of the battery 20, Tb represents the battery temperature, I represents charge current, R represents internal resistance of the battery 20, K represents a heat radiation coefficient, and Qc represents a heat capacity.

The above TLIM and K are decided in advance based on performance of the battery 20. Qc is decided such as by a pack structure of the cell forming the battery 20, etc. Ta is obtained from the temperature sensor 15 and Tb is obtained from the temperature sensor 14. I is calculated in step S4. R is determined such as from a deterioration level by calculation.

The controller 10 obtains parameters included in the above formula (1) from a detected value of the sensor and calculation, and calculates a limit-temperature timing with the formula (1).

In step S8, the controller 10 calculates an SOC (hereafter also called as a limit temperature SOC) when the battery temperature reaches the limit temperature. Specifically, the controller 10 determines an integrated value of the charge current from the start of charging to the limit-temperature timing, and by adding the integrated value to the present charge capacity of the battery 20, calculates a charge capacity at the limit-temperature timing. The controller 10 calculates a limit temperature SOC by dividing the charge capacity at the limit-temperature timing by the full-charge capacity.

In step S9, the controller 10 obtains a plurality of target SOCs from a memory not shown in the figure.

In step S10, the controller 10 compares the target SOC, limit temperature SOC, and CCCV switching SOC, and specifies the lowest SOC. For example, assume that a calculation result of the limit temperature SOC is 45% and a calculation result of the CCCV switching SOC is 60%. When the target SOC is 25%, the lowest SOC becomes the target SOC and when the target SOC is 50%, 75%, or 100%, the lowest SOC becomes the limit temperature SOC.

The controller 10 switches a calculation method of the charge time according to the SOC type specified as the lowest SOC from the three types of SOCs (the target SOC, limit temperature SOC, and CCCV switching SOC). When the CCCV switching SOC is the lowest, the controller 10 calculates a charge time in the calculation processing of step S11. When the target SOC is the lowest, the controller 10 calculates a charge time in the calculation processing of step S12. When the limit temperature SOC is the lowest, the controller 10 calculates a charge time in the calculation processing of step S13.

Figure 4:
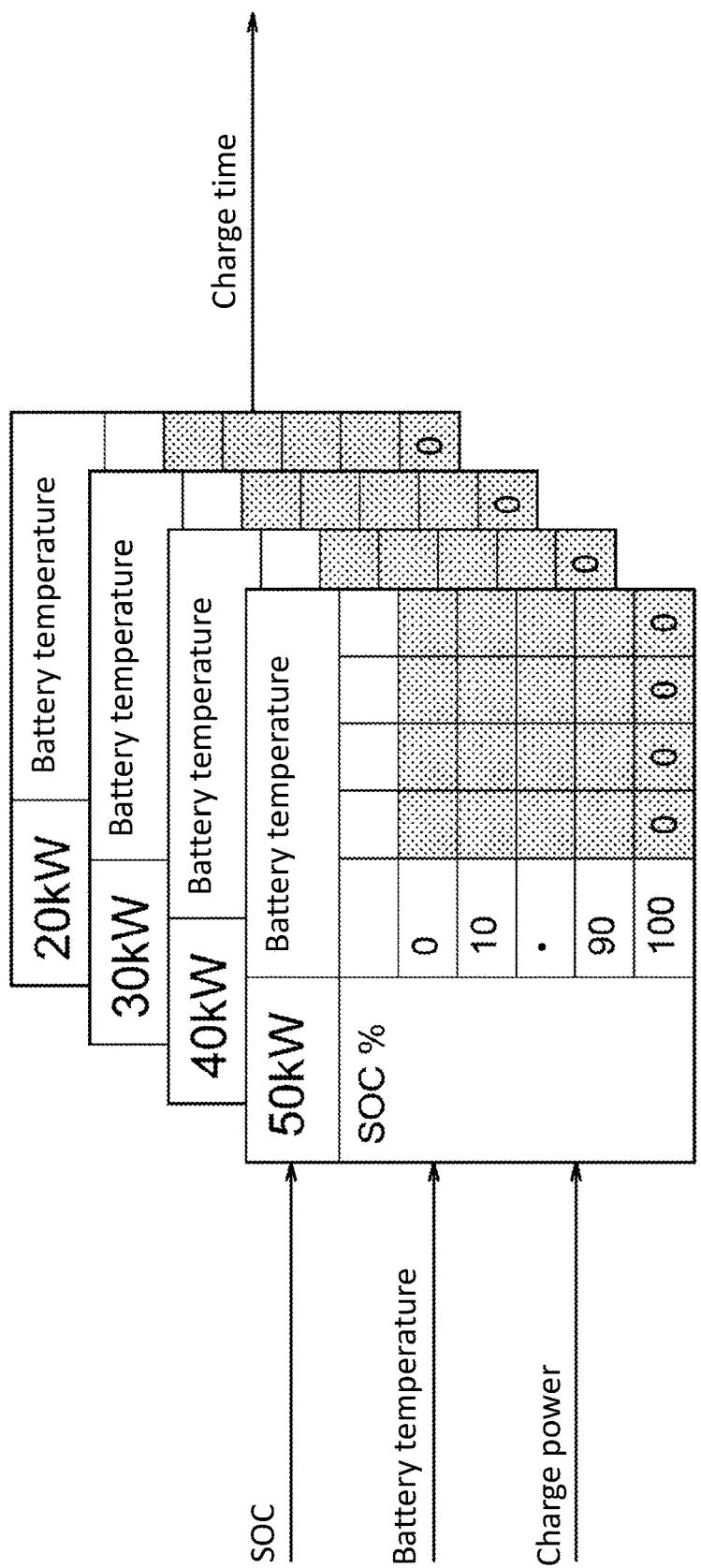
FIG. 4 is a diagram for explaining correspondence between a battery temperature, SOC, charge power, and charge time.

In step S11, the controller 10 calculates the charge time of the battery 20 based on the temperature of the battery at the start of charging, SOC at the start of charging, and charge power. FIG. 4 is a figure for explaining a map showing correspondence between the battery temperature, SOC, charge power, and charge time. To the memory, the map shown in FIG. 4 is stored in advance. The map shown in FIG. 4 shows the charge time when charging up to a predetermined SOC, and the map is stored by each of the plurality of target SOCs. The controller 10 selects a map that corresponds to the target SOC and calculates the charge time that corresponds to the battery temperature at the start of charging, SOC, and charge power.

In step S12, the controller 10 calculates the charge time by dividing the charge capacity required for charging the SOC at the start of charging to the target SOC by the charge current of the charge in the CC method.

In step S13, the controller 10 calculates a total charge time by adding the charge time after the limit-temperature timing (hereafter also called as the second charge time) to the charge time before the limit-temperature timing (hereafter also called as the first charge time). The total charge time is the charge time between the present SOC and target SOC of the battery 20.

The controller 10 calculates a second charge time using the map shown in FIG. 4. The controller 10 applies the surrounding temperature of the battery 20 at the start of charging to the battery temperature on the map, and applies the limit temperature SOC to the SOC on the map. Also, the controller 10 applies the outputtable power of the charger to the charge power on the map. When the temperature of the battery 20 reaches the limit temperature, the charge power is limited according to the battery temperature (corresponds to the limit temperature). More, the controller 10 may apply the charge current at the limit-temperature timing instead of the charge power. When applying the charge current, correspondence with the charge time is shown with the charge current instead of the charge power on the map. By referencing the map of FIG. 4, the controller 10 calculates charge time corresponding to the surrounding temperature of the battery 20, limit temperature SOC, and charge current at the time of limit-temperature timing as a second charge time. Then, the controller 10 calculates the total charge time by adding the second charge time to the first charge time.

After the charge time ends by Steps S11 to S13 of the control flow, the controller 10 decides a charge time that corresponds to the specified target SOC from the calculated charge time according to the target SOC specified by the user. The controller 10, by subtracting the charge time in a countdown after start of the charge of the battery 20, calculates the charge time during a charge.

As described above, in the charge controller according to the present embodiment, the controller 10 calculates an SOC of the battery based on the present voltage of the battery 20, and calculates a chargeable power of the battery based on the charge upper-limit voltage of the battery 20. The controller 10 compares the chargeable power and outputtable power of the charger 11, calculates the lower power as the charge power, and calculates the limit-temperature timing based on the temperature of the battery 20, surrounding temperature of the battery 20, and charge current when charging with the charge power. The controller 10 calculates the limit charge power limited according to the battery temperature. The controller 10 references a map showing the charge power, state of charge, battery temperature, and correspondence of the charge time, based on the state of the battery 20 and charge power when the limit-temperature timing is reached, calculates a second charge time that comes after the limit-temperature timing. Then, the controller 10 calculates the time by adding the second charge time to the first charge time until the limit temperature timing is reached as a total charge time of the battery 20. In this way, calculation accuracy of the charge time can be raised.

In the present embodiment, when the limit-temperature timing comes earlier than the CCCV switching timing, the first charge time and second charge time are each calculated, and by adding the second charge time to the first charge time, the total charge time is calculated.

When the limit-temperature timing comes earlier than the CCCV switching timing, it can be considered that, as a calculation method of charge time different from the present embodiment, the charge time may be calculated from the battery state at the start of charging (SOC and battery temperature) and charge power at the start of charging by referencing the map shown in FIG. 4. In other words, without separating between the limit-temperature timing and CCCV switching timing, a method of calculating the charge time only from the map calculation that uses the map shown in FIG. 4 can be also considered. However, when a high-speed travel and quick charge are repeated in a short period, for example, the temperature at the start of charging becomes high compared to the surrounding temperature of the battery 20, and thus when the total charge time is determined by map calculation using the map shown in FIG. 4, a problem that calculation accuracy becomes low occurs. Thus, as to the temperature condition included to the map of FIG. 4, normally, a state where the battery 20 is left as it is for a long time, temperature of the battery 20 is stable, and there is no difference between the battery temperature and surrounding temperature is used. For this reason, when the state of the battery 20 assumed in the map and the actual state of the battery 20 are different, the calculation accuracy becomes low.

More, the surrounding temperature of the battery 20 may be added to the parameter included to the map. However, that is a problem that the map becomes complicated.

In the present embodiment, the time from the start of charging of the battery until the limit temperature is reached is calculated as the first charge time based on the state of the battery 20 at the start of charging while using the relational expression including the heat generation amount of the battery 20, heat radiation amount, pack heat capacity, battery temperature, surrounding temperature of the battery 20, and charge current at the start of charging. Then, based on the battery state and limit charge power when the battery 20 reaches the limit temperature, the second charge time is calculated by map calculation. In this way, when the battery state is not the state suitable for the map calculation at the start of charging, calculation accuracy of the charge time can be raised.

Also, in the present embodiment, after calculating the CCCV switching timing and when the CCCV switching timing comes earlier than the limit-temperature timing, while referencing the map shown in FIG. 4, a total charge time is calculated based on the state of the battery 20 at the start of charging and charge power at the start of charging. In this way, in the present embodiment, when the battery temperature can be suppressed to the limit temperature or below from the start of charging to the end of charging, the charge time can be calculated with high accuracy.

Further, in the present embodiment, the second charge time is calculated based on the SOC at the limit-temperature timing, surrounding temperature of the battery 20, and limit charge power. In this way, calculation accuracy of the charge time can be raised.

Additionally, in the present embodiment, before the battery charge actually starts, the total charge time is calculated. As the calculation method of the charge time in the present embodiment can obtain parameters required for the calculation earlier than the actual charging, the charge time can be calculated before the charging actually starts.

DESCRIPTION OF REFERENCE NUMERALS

10 . . . controller
11 . . . charger
12 . . . voltage sensor
13 . . . current sensor
14, 15 . . . temperature sensor
20 . . . battery
30 . . . power supply
50 . . . controller
100 . . . charge controller

What is claimed is:

1. A charge-time calculation method for calculating a total charge time for charging a battery to a predetermined target state of charge by a charge power from a charger comprising:
    detecting:
        a battery temperature showing a temperature of the battery using a temperature sensor; and
        a battery surrounding temperature showing a surrounding temperature of the battery by using another temperature sensor;
    detecting a voltage of the battery by using a voltage sensor;
    calculating a state of charge of the battery based on the voltage of the battery;
    calculating a chargeable power of the battery based on the voltage of the battery and a charge upper-limit voltage of the battery;
    comparing the chargeable power and an outputtable power of the charger to set a lower power as a first charge power;
    calculating a timing that the battery temperature reaches a predetermined limit temperature as a first timing, based on the battery temperature, the battery surrounding temperature, and a charge current when charging with the first charge power, the predetermined limit temperature being a temperature at which the charge current is limited to a current that does not raise the battery temperature;
    calculating a second charge power that is reduced according to the battery temperature to a power below the first charge power;
    calculating a second charge time based on the state of charge when the first timing is reached and the second charge power, wherein the second charge time is a charge time after the first timing and is calculated by referencing a map showing correspondence between the charge power, the state of charge, the battery temperature, and the charge time of the battery;
    calculating a second timing where the chargeable power becomes below the outputtable power after start of the battery charge; and
    when the second timing comes earlier than the first timing, calculating a total charge time based on the state of charge of the battery at the start of battery charging, the first charge power, and the second charge time while referencing the map, wherein the first charge time is a charge time calculated from a starting time of charging the battery to the first timing.

2. The charge-time calculation method according to claim 1, wherein in the calculation of the second charge time, the second charge time is calculated based on the state of charge at the first timing, the battery surrounding temperature, and the second charge power.

3. The charge-time calculation method according to claim 1, wherein the total charge time is calculated before charging of the battery actually starts.

4. A charge controller comprising:
one or more temperature sensors for detecting a battery temperature showing a temperature of a battery and for detecting a battery surrounding temperature all showing a temperature around the battery;
a voltage sensor for detecting voltage of the battery;
a charger for outputting charge power to the battery; and
a controller for controlling the charger and calculating a total charge time for charging the battery to a predetermined state of charge,
wherein, the controller:
calculates a state of charge of the battery based on the voltage of the battery;
calculates a chargeable power of the battery based on the voltage of the battery and a charge upper-limit voltage of the battery;
compares the chargeable power and an outputtable power of the charger to set a lower power as a first charge power;
calculates a timing that the battery temperature reaches a predetermined limit temperature as a first timing based on the battery temperature, the battery surrounding temperature, and the charge current when charging with the first charge power, the predetermined limit temperature being a temperature at which the charge current is limited to a current that does not raise the battery temperature;
sets a second charge power that is reduced according to the battery temperature to a power below the first charge power;
calculates a charge time that comes after the first timing as a second charge time based on the state of charge when the first timing is reached and the second charge power, wherein the second charge time is calculated by referencing a map showing correspondence between the charge power, the state of charge, battery temperature, and the charge time of the battery;
calculating a second timing where the chargeable power becomes below the outputtable power after start of the battery charge;
when the second timing comes earlier than the first timing, calculates a total charge time based on the state of charge of the battery at the start of battery charging, the first charge power, and the second charge time while referencing the map;
charges the battery with the first charge power after calculation of the total charge time; and
charges the battery with the second charge power after charging with the first charge power, wherein the first charge time is a charge time calculated from a starting time of charging the battery to the first timing.

* * * * *